(12) United States Patent
Mair

(10) Patent No.: US 7,832,971 B2
(45) Date of Patent: Nov. 16, 2010

(54) THREADED ELEMENT

(75) Inventor: Roland Mair, Gotzis (AT)

(73) Assignee: SFS Intec Holding AG, Heerbrugg (CH)

( * ) Notice: Subject to any disclaimer, the term of this patent is extended or adjusted under 35 U.S.C. 154(b) by 363 days.

(21) Appl. No.: 11/722,030

(22) PCT Filed: Feb. 14, 2006

(86) PCT No.: PCT/EP2006/050907
§ 371 (c)(1),
(2), (4) Date: Jun. 18, 2007

(87) PCT Pub. No.: WO2006/089849
PCT Pub. Date: Aug. 31, 2006

(65) Prior Publication Data
US 2009/0274535 A1 Nov. 5, 2009

(30) Foreign Application Priority Data
Feb. 25, 2005 (DE) .................. 10 2005 008 779

(51) Int. Cl.
F16B 35/04 (2006.01)
(52) U.S. Cl. ..................... 411/421; 411/418
(58) Field of Classification Search .......... 411/417, 411/421, 418, 329
See application file for complete search history.

(56) References Cited
U.S. PATENT DOCUMENTS

| | | | | | |
|---|---|---|---|---|---|
| 142,112 | A | * | 8/1873 | Ladd | 411/421 |
| 1,235,626 | A | * | 8/1917 | Woodward | 411/421 |
| 1,288,893 | A | * | 12/1918 | Holmes | 411/421 |
| 1,963,536 | A | * | 6/1934 | Trotter | 411/306 |
| 2,232,337 | A | * | 2/1941 | Meersteiner | 72/88 |
| 2,393,990 | A | * | 2/1946 | Kamborian | 12/142 R |
| 2,562,516 | A | * | 7/1951 | Williams | 470/11 |
| 4,697,969 | A | * | 10/1987 | Sparkes | 411/387.7 |
| 5,110,245 | A | * | 5/1992 | Hiroyuki | 411/421 |
| 5,702,445 | A | * | 12/1997 | Br.ang.nemark | 606/60 |
| 5,725,581 | A | * | 3/1998 | Br.ang.nemark | 606/304 |
| 5,759,003 | A | * | 6/1998 | Greenway et al. | 411/421 |
| 2003/0108403 | A1 | * | 6/2003 | Scoyoc | 411/421 |

FOREIGN PATENT DOCUMENTS

| | | |
|---|---|---|
| DE | 35515 | 7/1885 |
| DE | 8907705 | 9/1989 |
| EP | 1323935 | 12/2002 |

* cited by examiner

Primary Examiner—Gary Estremsky
(74) Attorney, Agent, or Firm—Volpe and Koenig, P.C.

(57) ABSTRACT

A threaded element (1) is provided having at least two slots (3), notches, grooves or the like that intersect the thread (2). The slots (3), notches, grooves or the like are configured in relation to the thread (2) so that they intersect the thread (2) to form a sharp cutting edge on the thread flanks (4), thus preventing reverse rotation. The slots, notches or grooves have no more than 25-times the pitch and the same rotational direction as the thread.

6 Claims, 2 Drawing Sheets

THREADED ELEMENT

BACKGROUND

The present invention relates to a threaded element comprising at least two slots, notches, grooves, or the like intersecting the thread.

A device of the type mentioned at the outset is known for various special applications. In particular, a cutting screw is known from DIN 7513 provided with slots, notches, grooves, or the like intersecting the thread. They extend approximately axially parallel in reference to the central axis of the screw and are formed in order to allow the thread to cut. Threaded elements embodied in this way are also used for thread-cutting tools. Screws provided with thread elements of this type are completely unsuitable to prevent a reverse rotation.

Further, from EP 1 323 935 A1 a thread-forming concrete screw is known, characterized in a low rotational torque. Screws of the type described have previously been used in particular such that the slots, notches, grooves, or the like support the features during the screw-in or the thread cutting process.

From DE 89 07 705 U1 it is known that, in order to prevent a reverse rotation of two threaded elements engaging each other, both the thread area of one threaded element as well as the one of the other threaded element are provided with catching areas corresponding to each other. One threaded element is a plastic element, with its barbed areas allowing the other threaded element to overcome them with its barbed areas during tightening without leaving any lasting deformation such that the barbed areas engage each other in the finally installed condition and ensure the parts remain screwed to each other against loosening. This known securing is conditional on one thread element being engaged to another threaded element embodied appropriately. Such a safety from reverse rotation is not suitable to prevent a threaded element screwed into a work piece from any reverse rotation.

SUMMARY

The object of the invention is to provide a threaded element of the type mentioned at the outset such that a reverse rotation of the threaded element out of a work piece is prevented.

According to the preamble of claim 1 this is achieved in a threaded element, in that slots, notches, grooves, or the like having a shape in reference to the thread, which when intersecting the thread form a sharp edge engaging the work piece at the thread flanks as the safety from reverse rotation, and in particular that they have no more than 25-times the pitch in the same rotational direction. A blocking surface and a gliding surface form at the thread path by the slot, notch, groove or the like. While the gliding surface contributes during the screw-in process in the thread formation momentum being kept as low as possible, the object of the blocking surface is to form a resistance moment as high as possible during a reverse rotation by its sharp edges and thus to prevent a reverse rotation. The lower the difference in the pitch of the slot, notch, groove, or the like in reference to the pitch of the thread the more acute the intersecting angle by the slot, groove, notch, or the like crossing the thread. The angle and the pitch, respectively, of the slot, notch, groove, or the like is designed such that forces acting onto these edges can be compensated at the thread flanks and that this leads to a blocking effect when turning inversely, according to the invention. The shape of the slot, notch, groove, or the like can be selected asymmetrically so that the blocking surface almost perpendicularly crosses the convolution and the gliding surface transfers into the thread flanks via an angle as obtuse as possible and with a rounded edge. Any reverse rotation is therefore prevented by the shape of the thread itself, according to the invention. The use of glue, coatings or the like and additional elements for preventing a reverse rotation, such as washers, etc. can therefore be omitted.

In another embodiment the slot, notch, groove, or the like is embodied almost reaching a diameter of the thread core or even deeper. By the depth of the slot, notch, groove, or the like, the edge between the blocking surface and the thread flank is determined. The deeper the slot, notch, groove, or the like is embodied, the longer this edge. The longer the blocking edge the greater the blocking effect against any reverse rotation. When the slot, notch, groove, or the like is embodied deeper than the core diameter the blocking effect increases only slightly, because the counter thread contacts the thread flank only to the core diameter at the most.

Another variant results from the material displaced by the slots, notches, grooves, or the like largely collecting on the remaining thread so that the exterior thread diameter is larger than in an identical thread without any slots, notches, grooves, or the like. By suitable deformation processes it can be achieved that the material displaced by the slot, notch, groove or the like is pressed into the thread path. Ideally the deformed material is bulged to the tip of the thread flank. This leads to the exterior thread diameter being enlarged and thus a clamping effect develops by the increased surface pressure between the threaded element and the counter thread. The effect appears particularly pronounced when the blocking surface is bulging in the proximity to the largest exterior diameter, because here the blocking moment has the greatest blocking effect based on the principles of leverage. The blocking effect can be further increased by embodying the slot, notch, groove, or the like such that the exterior thread diameter is interrupted along a length of the circumference as long as possible.

In this context it is possible for a second thread section to follow the thread having slots, notches, grooves, or the like with an incoming, uninterrupted thread of the same pitch. Uninterrupted threads are characterized in a lower screwing-in moment, which reduces the torque. This second thread section may also comprise an incoming and fully formed thread section. This way, the desired blocking force can be arbitrarily varied within the laws of mechanics. When the thread is not fully formed and thus the exterior thread diameter in this second thread section is slightly reduced, the blocking force increases more than when the second thread section is provided with a fully formed thread flank with a larger exterior thread diameter. Additionally, the thread element is preferably used in screw-like fastening elements. In this case, in addition to the thread head, the thread part and, at most, a bore, form the elements responsible for securing against reverse rotation.

In another embodiment, the axial length of the thread with the slots, notches, grooves, or the like is at least approximately equivalent to a thickness of the work piece, into which the thread is to be inserted. It is completely sufficient for the thread element according to the invention to be inserted at the position, at which the counter thread engages in the inserted state. Thus, when mounting several elements it is absolutely sufficient to insert the thread element according to the invention only in the area of the element with the counter thread engaging the thread. In thin sheet metals it is perhaps recommended to embody the length of the slot, notch, groove, or the like slightly longer than the thickness of the sheet metal because sheet metal easily deforms and the precise position is harder to calculate.

In another advantageous embodiment, the thread is self-forming, self-cutting, or the like. The embodiment of the threaded element according to the invention can be used in all known, even non-round thread forms. For example, self-forming, self-cutting thread types or the like are particularly suitable.

Additional advantages and embodiments of the invention result from the sub claims.

BRIEF DESCRIPTION OF THE DRAWINGS

Exemplary embodiments of the invention are explained in the following with reference to the drawing. Shown are.

DETAILED DESCRIPTION OF THE PREFERRED EMBODIMENTS

Figure 1:
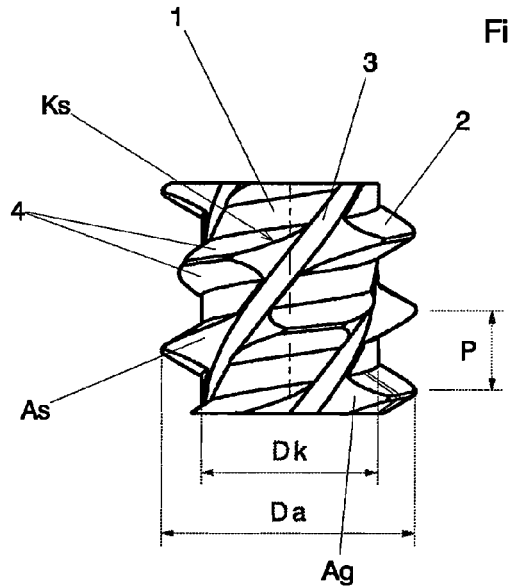
FIG. 1 a view of a threaded element with prevention from reverse rotation via a groove intersecting the thread.
Figure 2:
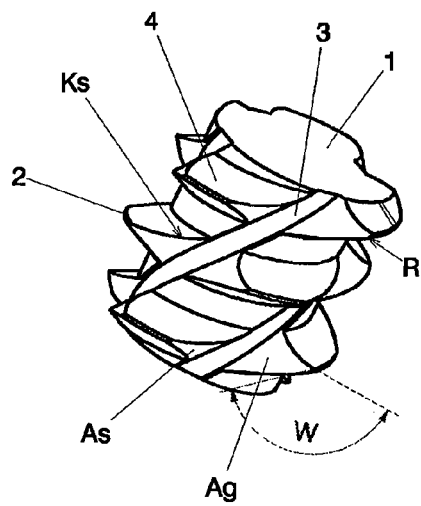
FIG. 2 a 3-D view of the threaded element with prevention from reverse rotation via a groove intersecting the thread.

A threaded element 1 is shown in FIGS. 1 and 2 with at least two slots, notches, grooves 3 or the like intersecting the thread 2, is provided with slots, notches, grooves 3 or the like, which in reference of the thread 2 form a sharp blocking edge Ks at the thread flanks 4 engaging a work piece 6 (FIG. 3) by its shape, which effects a securing from a reverse rotation when intersecting the thread 2, and preferably have no more than 25-times the pitch P in the same rotary direction. The slot, notch, groove 3 or the like intersecting the thread 2 forms a gliding surface Ag and a blocking surface As in the thread flank 4. By the shape of the slot, notch, groove 3 or the like, which may also be asymmetrical, the gliding surface Ag supports the threading, by the gliding surface Ag transferring into the thread flank 4 at an obtuse angle W and with a radius R. The blocking surface As on the opposite side is designed such that the blocking surface As intersects the thread flanks 4 as radially as possible and with an edge that is as sharp as possible. Depending on the desired blocking effect, any other shape may be provided for the slot, notch, groove 3 or the like. The blocking effect may be even increased by interrupting the thread flank 4 at the exterior thread diameter Da as wide as possible by the slot, notch, groove 3 or the like. In this way it is affected by the elastic deformation of a counter thread 5 in the work piece 6 that the diameter slightly shrinks, and when reaching the blocking surface As, first must be pressed outward by said elastic section. A threaded element 1 according to the invention with an exterior thread diameter De of approximately 5 millimeters typically shows a pitch of 1.8 millimeters in the thread. When the slot, notch, groove 3 or the like is now provided with a pitch of less than 45 millimeters, the cutting surfaces with the thread 2 resulting therefrom fulfill the conditions to achieve a blocking effect by the thread. Advantageously a pitch ratio of no more than 15 is used, which is equivalent to no more than 27 millimeters. Typically, the pitch ratio used ranges even from 5 to 10, so that a pitch of no more than 18 millimeters is used. The lower the pitch ratio, the more acutely the thread 2 is intersected by the slot, notch, groove 3 or the like, and the blocking edge is correspondingly longer, which leads to an increased blocking effect.

Here, the slot, notch, groove 3 or the like is embodied almost reaching the core thread diameter $D_k$ or deeper. The blocking surface As intersects the thread flank 4 on a maximum length and thus forms a long blocking edge Ks. When the slot, notch, groove 3 or the like is formed even deeper, the effect is increase only slightly because the counter thread 5 must be provided with a larger diameter than the core thread diameter Dk of the threaded element 1.

The material displaced by the slot, notch, groove 3 or the like is largely formed in the remaining thread 2, so that the exterior thread diameter Da is larger than an identical thread 2 without slots, notches, grooves 3 or the like. By an optimum deformation process during rolling the displaced material can flow from the slot, notch, groove 3 or the like into the remaining threads. The thread flank 4 is thus better formed particularly in the proximity of the blocking edge Ks. The exterior thread diameter Da thus slightly increases accordingly and prevents the reverse rotation by the blocking edge Ks. This effect may be achieved even better in particularly in an asymmetrically arranged slot, notch, groove 3 or the like.

The threaded element 1 according to the invention is particularly suitable to provide a self-forming, self-cutting thread or the like. The blocking effect can be particularly well combined with self-forming, self-cutting thread embodiments or the like, without limitations.

Figure 3:
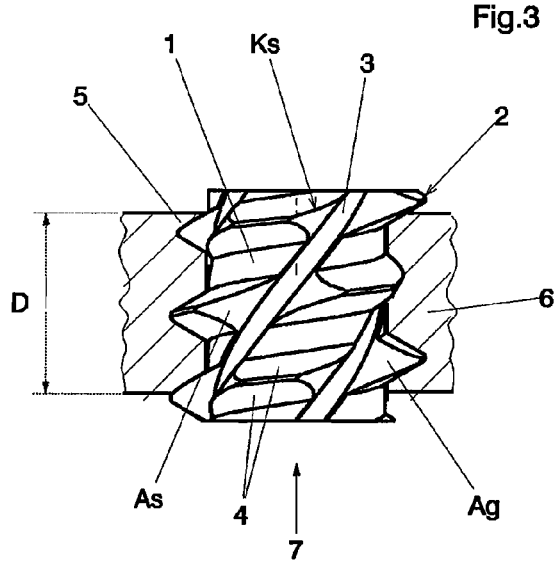
FIG. 3 a view of the threaded element formed in a work piece.

In the embodiment variant according to FIG. 3, the axial length of the thread 2 with slots, notches, grooves 3 or the like is at least approximately equivalent to a thickness D of the work piece 6, into which the thread 2 is to be inserted. In order for the blocking effect of the threaded element 1 to show its effect it must be screwed into the counter thread 5. A maximum effect is then achieved when the slots, notches, grooves 3 or the like are provided over almost the entire thickness D of the work piece 6 with the counter thread 5.

When using thin sheet metals as work pieces 6 it is useful, though, to provide the slot, notch, groove 3 or the like over a slightly greater length, because the sheet metal can easily be deformed at the bore 7 and the absolute position is then no longer precisely given.

Figure 4:
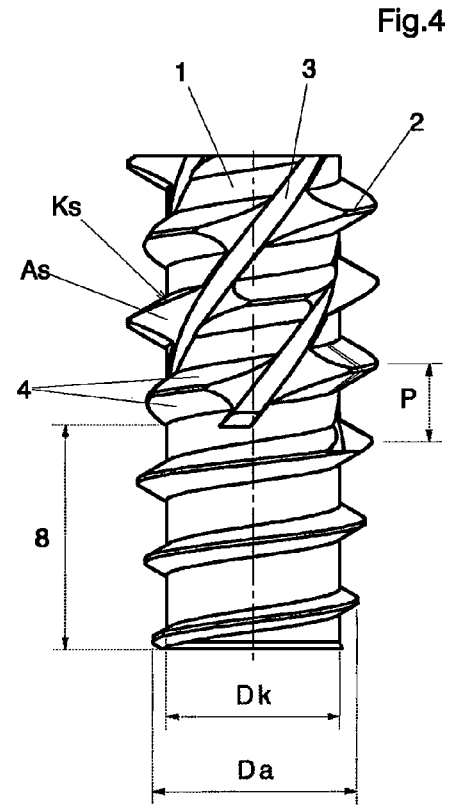
FIG. 4 a view of a threaded element with an adjacent threaded part.
Figure 5:
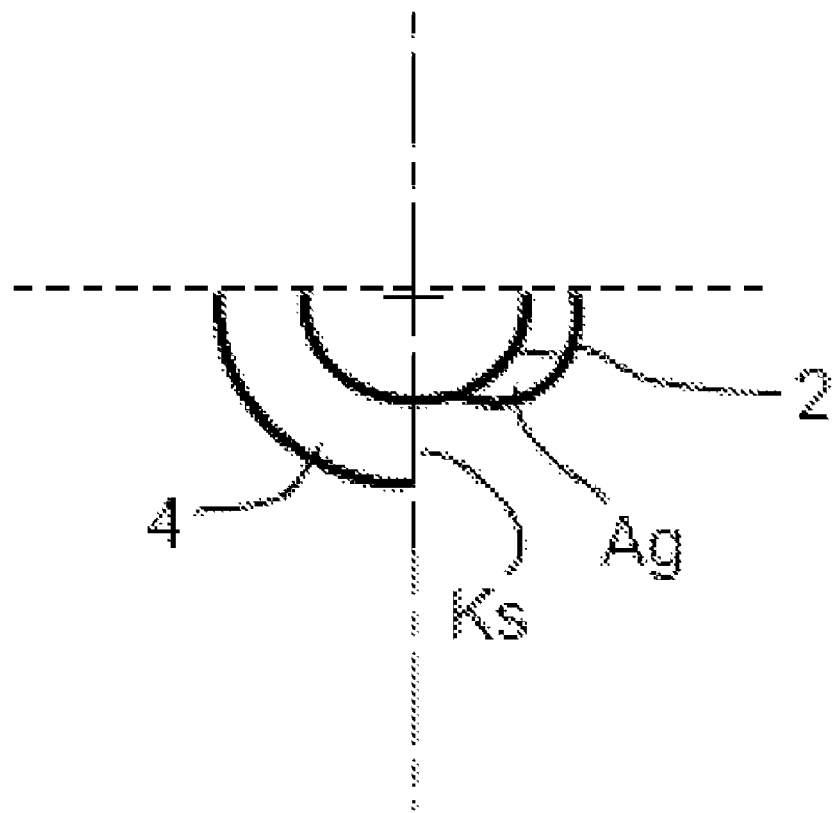
FIG. 5 is a schematic illustration of a partial top section view of the threaded element according to the present invention.

In another embodiment variant of FIG. 4, a second threaded section 8 with an incoming, uninterrupted thread 2 is shown with the same pitch P which follows the thread 2 with the slots, notches, grooves 3 or the like. In such combinations, the threaded element 1 according to the invention can e.g., be inserted into a screw-like connection element in combination with a screw head, additional threaded elements with the same thread pitch P, a bore element, and additional elements. The position of the threaded element 1 according to the invention can thus be adjusted precisely to the requirements, in particular, of the installed position.

The invention claimed is:

1. A threaded element (1) comprising at least two slots, notches, or grooves (3) intersecting a thread thereof, the slots, notches, or grooves (3) are provided with a shape in reference to the thread such that when intersecting the thread, a blocking edge (Ks) is formed at a thread flank (4), on a first side of the slots, notches or grooves, and a gliding surface (Ag), opposite the blocking edge (Ks), on a second side of the slots notches or groove, the gliding surface (Ag) transitions from the thread flank (4) at an obtuse angle (W), and the blocking edge (Ks) intersects the thread flank (4) generally perpendicularly, the blocking edge (Ks) adapted to engage a work piece (6) thereby securing against reverse rotation, the slots notches or grooves have no more than 25-times a pitch of the thread and have the same rotational direction.

2. A threaded element according to claim 1, wherein the slot, notch, or groove (3) extends to a depth almost reaching or extending into a core thread diameter (Dk).

3. A threaded element according to claim 1, wherein material displaced by the slots, notches, or grooves (3) is largely formed into a remaining portion of the thread (2) allowing for a larger exterior thread diameter (Da) than a portion having a thread without any slots, notches, or grooves (3).

4. A threaded element according to claim 1, wherein a second threaded section (8) with an incoming uninterrupted thread (2) with the same pitch follows the thread with the slots, notches, or grooves (3).

5. A threaded element according to claim 1, wherein an axial length of the thread with the slots, notches, or grooves (3) is adapted to correspond to a thickness of a work piece (8), into which the thread (2) is to be inserted.

6. A threaded element according to claim 1, wherein the thread (2) is self-forming or self-cutting.

* * * * *